Jan. 15, 1946  H. D. STECHER ET AL  2,392,886
METHOD OF COPPER BRAZING
Original Filed Feb. 15, 1940
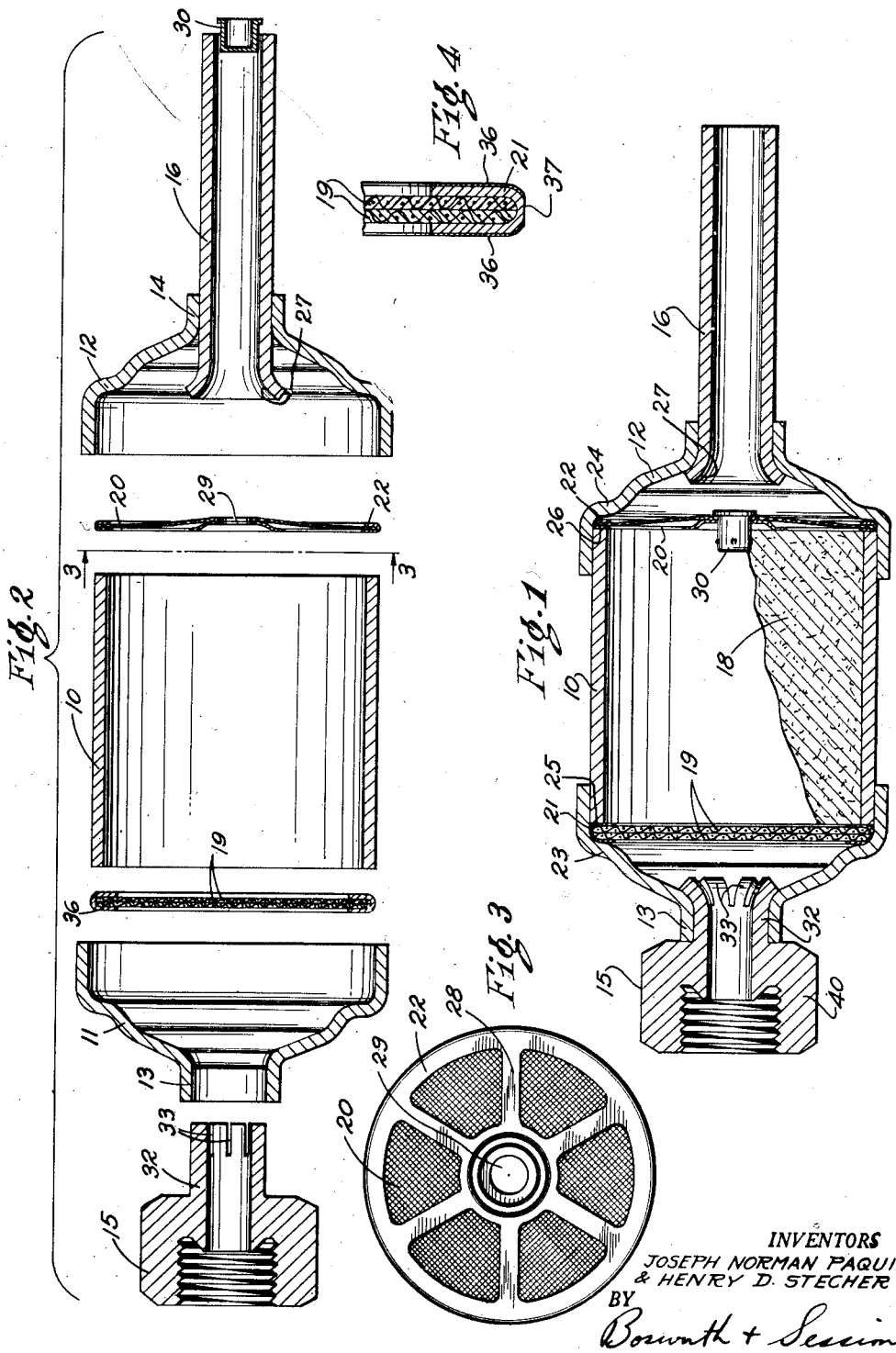
INVENTORS
JOSEPH NORMAN PAQUIN
& HENRY D. STECHER
BY
Bosworth + Sessions
ATTORNEYS

UNITED STATES PATENT OFFICE 2,392,886

METHOD OF COPPER BRAZING

Henry D. Stecher, Lakewood, and Joseph Norman Paquin, Euclid, Ohio, assignors to The Weatherhead Company, Cleveland, Ohio, a corporation of Ohio Original application February 15, 1940, Serial No. 319,046. Divided and this application May 3, 1943, Serial No. 485,524

3 Claims. (Cl. 113—112)

This invention relates to methods of copper brazing. The invention is described herein in conjunction with the manufacture of dehydators such as are used in refrigeration systems, but it is to be understood that this description is given only by way of example, and that the method is useful in the manufacture of various other articles and devices. This application constitutes a division of our co-pending application Serial No. 319,046, filed February 15, 1940, now Patent No. 2,323,160, issued June 29, 1943.

The art of copper brazing is well known and is widely used in joining together parts composed of ferrous material. Briefly, the copper brazing process is carried out by assembling the parts to be joined, supplying metallic copper to or adjacent the contacting surfaces of the several parts and passing the assembly through a brazing furnace having a reducing atmosphere in which the temperature of the parts is raised to about 2200° F. At this temperature, and in the proper atmosphere, the copper becomes fluid and forms an alloy with the adjacent surfaces of the ferrous material. The molten copper wets the ferrous surfaces, is drawn by capillary attraction between the contacting surfaces of the parts, and upon cooling, forms an extremely strong alloy bond throughout substantially the entire contacting areas of the parts. The copper is supplied in various ways known to those skilled in the art. For example, the parts may be electro-plated with copper, or small copper wires may be disposed adjacent the contacting surfaces before the assembly is placed in the furnace.

The process is widely used and is especially advantageous in the manufacture of articles made up of a plurality of stampings. However, the very fluidity of the copper in the brazing furnace has heretofore imposed limitations upon the use of the method. Because of its fluidity, the copper may flow into places where it is not wanted, secure together parts that are supposed to remain separate, and even dissolve some materials with which it comes in contact. It is a general object of the present invention to provide a method whereby these difficulties may be obviated. Another object is to provide an efficient and economical method of protecting surfaces from the action of molten copper in the brazing furnace. Another object is to provide a method of treating ferrous surfaces which will prevent the copper from wetting them during the brazing operation. Another and more specific object of our invention is to provide a method of making dehydrators and the like, wherein a wire screen is brazed into place in the assembly. A further object is to provide a method of securing wire screen within a copper brazed assembly while preventing the copper from damaging the screen. Further objects and advantages of the invention will become apparent from the following description of a preferred form thereof, reference being made to the accompanying drawing. The essential characteristics are summarized in the claims.

In the drawing, in which we have illustrated by way of example a dehydrator made according to our method, Fig. 1 is a longitudinal section through the dryer or dehydrator; Fig. 2 is a view showing the parts making up the device shown in Fig. 1, but before they have been assembled, and Figs. 3 and 4 are details of the screens employed in the device.

As shown on the drawing, a dehydrator made according to our invention preferably comprises a chamber made up of a central cylindrical section 10, and end members 11 and 12, preferably in the form of hollow stampings having flanges adapted to embrace the central section, and drawn portions 13 and 14, respectively, adapted for connection with the fitting 15 and the tube 16.

In the completed dryer, the central portion of the container is substantially filled with fine granules of silica gel, indicated at 18, which are retained in position by fine mesh screens, 19 and 20. The edges of the woven screen material are preferably housed by channel section rings 21 and 22. As shown in the drawing, the screens fit within the end members or caps 11 and 12, being disposed between the inwardly extending, generally radial portions 23 and 24 and the end faces 25 and 26 of the tubular member 10. While the engagement between the channel section members and the adjacent end members and central member 10 may be sufficient to retain the screens in position, the screens are preferably brazed in position by our method which will be described in greater detail below. One of the screens, 20 for example, is provided with a spider 28 and a central opening 29 as shown in Fig. 3. This opening is employed in filling the container with the silica gel and thereafter is closed by the plug 30.

The various parts are illustrated in position for assembly in Fig. 2 of the drawing, and as shown therein, all of the parts are of simple and inexpensive construction; thus, the body portion 10 may comprise an inexpensive section of tubing; the end members 11 and 12 are identical stampings which may be made readily and ecoknown design, provided with a slotted projecting portion 32, for engagement with the neck 13 of the end member 11, and the member 16 is merely a small piece of tubing having one end flared, as indicated at 27, and adapted to engage within the neck portion 14 of the end member 12. Obviously, various other fluid connection devices may be used in place of the members 15 and 16, these particular devices being shown only by way of example.

In assembling the various parts, the portion 32 of the fitting 15 may be inserted within the neck 13, of the member 11, preferably with a light press fit. After these parts are assembled, the fingers 33 of the neck portion 32 are expanded outwardly into engagement with the inner surface of the member 11, taking the position shown in Fig. 1. By this means, the fitting 15 is firmly held in position. Similarly, the tube 16 is inserted through the neck portion 14 of the member 12 until the flared end 27 of the tube is firmly in engagement with the inner surface of the neck portion. Thereafter, the screens 19 and 20 are inserted within the end members, 11 and 12, and finally the end members 11 and 12 and associated fittings and screens are assembled with the central tubular member 10.

The assembly is then ready for the brazing operation which is preferably carried out as described above by supplying metallic copper to or adjacent the contacting surfaces of the several parts and passing the assembly through a brazing furnace having a reducing atmosphere in which the temperature of the parts is raised to about 2200° F.

After the assembly is removed from the furnace and cooled, the dryer may be completed by pouring the required quantity of silica gel, or other moisture absorbing material into the central chamber, and closing the opening 29 by the plug 30, all as described in our aforesaid application.

As stated above, the copper becomes very fluid during the brazing operation and has a tendency to cover all of the ferrous surfaces to which it has access. According to our present invention, we eliminate difficulties which might otherwise occur by reason of the flow of the copper by applying to certain of the surfaces of the ferrous parts a material which will prevent the copper from wetting such surfaces. By this method, certain parts can be protected from the action of the copper, for molten copper, under ordinary circumstances, will not even flow across the treated surfaces. Preferably, the surfaces to be protected are chromium plated, or otherwise coated with a material containing chromium. The presence of the chromium apparently prevents the copper from wetting the underlying ferrous surfaces and thus prevents the formation of the copper iron alloy in the protected areas and prevents solution of the underlying material in the copper.

In the manufacture of dryers such as described above, it is particularly undesirable to have the copper reach the screen material, for screens composed of Monel metal wire are especially adapted for devices of this type, and at furnace temperatures the molten copper has a tendency to dissolve such screens. To prevent this from taking place, the steel channel rings 21 and 22 binding the screen material are coated with a thin layer 36 containing chromium, as by plating, peripheral edge portion thereof, as indicated at 37 in Fig. 4. The chromium prevents the copper from coating the underlying steel, so that the copper will adhere to the steel only where the chromium plating has been removed as at 37. By this means, the screens can be brazed firmly in place, but the protected areas of the channel members 21 and 22 prevent the copper from reaching the screens themselves. Alternatively, the material of the screens 19 and 20 may be chrome plated to protect them from the action of the copper. In this case, the steel binding rings 21 and 22 will not require the chromium plating described above.

Obviously, this method of preventing copper from adhering to certain areas of parts during a copper brazing operation, may be applied to the production of other articles and devices. There are many situations wherein it is desirable to protect surfaces from the action of molten copper during brazing operations. Thus various modifications and changes can be made in our invention without departing from the spirit and scope thereof. Therefore, it is to be understood that the foregoing description of a preferred form of our invention is given only by way of example, and that our patent is not limited to the preferred form described herein, or in any matter other than by the scope of appended claims, when given the range of equivalents to which our patent may be entitled.

We claim:

1. The method of securing a fine mesh, metallic screen within a copper brazed assembly while preventing copper from reaching the material of the screen, which includes the steps of binding the edges of the screen material with a chromium plated strip of ferrous material, removing the chromium plating from the peripheral portion of said ferrous material; assembling said screen with another ferrous member having a portion engaging said peripheral portion, supplying copper adjacent the contacting surfaces of said parts and passing the assembly through a brazing furnace to fuse the copper and form a bond between said peripheral edge and the adjacent ferrous parts, the chromium plating preventing the molten copper from flowing over said ferrous binding and on to said screen during the brazing operation.

2. The method of securing a member which is adversely affected by molten copper within a copper brazed assembly while preventing copper from reaching said member which includes the steps of binding said member with a strip of ferrous material, said ferrous material having its surfaces adjacent said member chromium plated and its peripheral portion unplated, assembling said member with another ferrous member having a portion engaging said peripheral portion, supplying copper adjacent the contacting surfaces of said portions and passing the assembly through a brazing furnace to fuse the copper and form a bond between said portions, the chromium plating preventing the molten copper from flowing on to said first named member during the brazing operation.

3. The method of securing a fine mesh, metallic screen within a copper brazed assembly while preventing copper from reaching the material of the screen, which includes the steps of binding the edges of the screen material with ferrous material, said ferrous material having its surfaces adjacent said screen coated with a coating containing sufficient chromium to prevent said coating being wet by molten copper in a reducing atmosphere, and having its peripheral portion uncoated, assembling said screen with the bound edge thereof disposed between two ferrous members to be brazed together and with said peripheral portion engaging one of said members, supplying copper adjacent the contacting surfaces of said members and passing the assembly through a brazing furnace having a reducing atmosphere to fuse the copper and form a bond between said members and the peripheral portion of the bound edge of said screen, the chromium preventing the molten copper from flowing over said binding of ferrous material and on to said screen during the brazing operation.

HENRY D. STECHER.
JOSEPH NORMAN PAQUIN.